May 19, 1970  W. HAPPER, JR  3,513,381
OFF-RESONANT LIGHT AS A PROBE OF OPTICALLY
PUMPED ALKALI VAPORS
Filed July 17, 1967  3 Sheets-Sheet 2

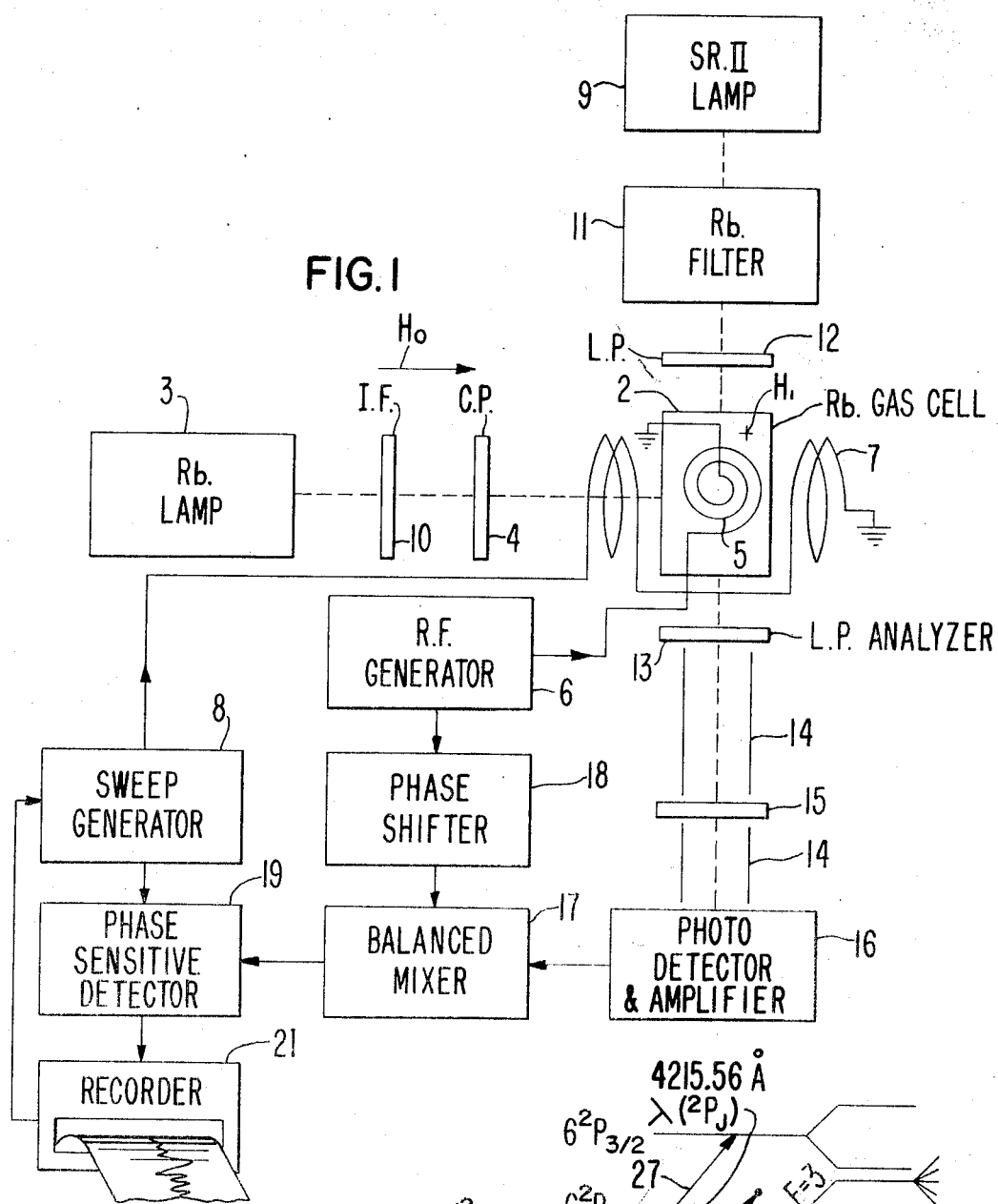

INVENTOR.
WILLIAM HAPPER, J
BY
ATTORNEY

INVENTOR.
WILLIAM HAPPER, J
BY
ATTORNEY

United States Patent Office 3,513,381
Patented May 19, 1970

---

3,513,381
OFF-RESONANT LIGHT AS A PROBE OF OPTICALLY PUMPED ALKALI VAPORS
William Happer, Jr., New York, N.Y., assignor to Varian Associates, Palo Alto, Calif., a corporation of California
Filed July 17, 1967, Ser. No. 653,717
Int. Cl. G01r *33/08*
U.S. Cl. 324—.5
2 Claims

ABSTRACT OF THE DISCLOSURE

Optically pumped alkali vapor spectrometers, magnetometers and frequency standard devices are described employing a beam of off-resonance light as a probe for detecting radio frequency transitions of optically pumped alkali vapor. The probing light is near to but not precisely at an optical resonant frequency of the alkali vapor and this off-resonance light beam is transmitted through the optically-pumped alkali vapor. Radio frequency transitions are resonances of the alkali vapor which are induced by suitable means such as an applied radio frequency field $H_1$, are detected by detecting changes in the rotation of the polarization of the off-resonance light traversing the alkali vapor. These changes in the rotation of the polarization of the probing light are converted into intensity modulation by suitable means such as an analyzer. This intensity modulation is detected by a photodetector to produce an output. In the magnetometer, the frequency of the radio frequency modulation is a measure of the D.C. magnetic field within a cell containing the alkali vapor. In the frequency standard, a field independent radio frequency hyperfine transition is detected by the off-resonance beam to provide an extremely stable and precise frequency standard output.

DESCRIPTION OF THE PRIOR ART

An off-resonance light component of an on-resonance probing sodium light beam has been employed in a spectrometer apparatus for detecting field dependent radio frequency Zeeman resonance of sodium vapor in an optically pumped cell of sodium vapor. Such an apparatus is descirbed in an article titled "On the Magnetic Rotatory Power of Optically Oriented Atoms" appearing in Compt. Rend., vol. 255, at page 1905, of Oct. 15, 1962.

A probing beam of off-resonance mercury light has been employed for observing radio frequency Zeeman resonance of optically pumped mercury vapor. Such an apparatus is described in an article titled "Optical Detection of Magnetic Resonance by Modulation of the Transverse Paramagnetic Faraday Effect at the Lamor Frequency" appearing in Compt. Rend., vol. 257, at page 413, dated July 8, 1963.

While such prior devices are of scientific interest, there was no disclosure therein of the practical case of an alkali vapor spectrometer, magnetometer, or frequency standard employing a probing beam of off-resonance light.

SUMMARY OF THE INVENTION

The object of the present invention is the provision of an improved optically pumped alkali vapor resonance apparatus.

One feature of the present invention is the provision of a beam of off-resonance light as a probe for detecting radio frequency resonance of an optically pumped ensemble of alkali vapor, whereby the probing beam does not depump the alkali vapor and concomitantly there is no attenuation of the probing beam, thereby permitting use of optically thick ensembles of alkali vapor.

Another feature of the present invention is the same as any one or more of the preceding features wherein the probing beam is directed through the alkali vapor in a direction perpendicular to a substantial component of the D.C. magnetic field vector within the vapor, whereby field dependent radio frequency resonance of the vapor is monitored or parallel to a substantial component of the D.C. magnetic field vector within the vapor to monitor field independent resonance thereof.

Another feature of the present invention is the same as any one or more of the preceding features wherein the detected radio frequency resonance signal is fed back to sustain radio frequency resonance of the vapor, whereby a self-sustaining oscillator is obtained at the radio frequency resonance frequency.

Another feature of the present invention is the same as the preceding feature wherein the off-resonance probing beam is of strontium light having a wavelength of about 4215.52 A., and the alkali vapor is rubidium.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of a spectrometer incorporating features of the present invention, FIG. 2 is a partial energy level diagram for rubidium showing certain of the optical and radio frequency resonances of interest.

DESCRIPTION OF THE PREFERRED EMBODIMENTS

Figure 3:
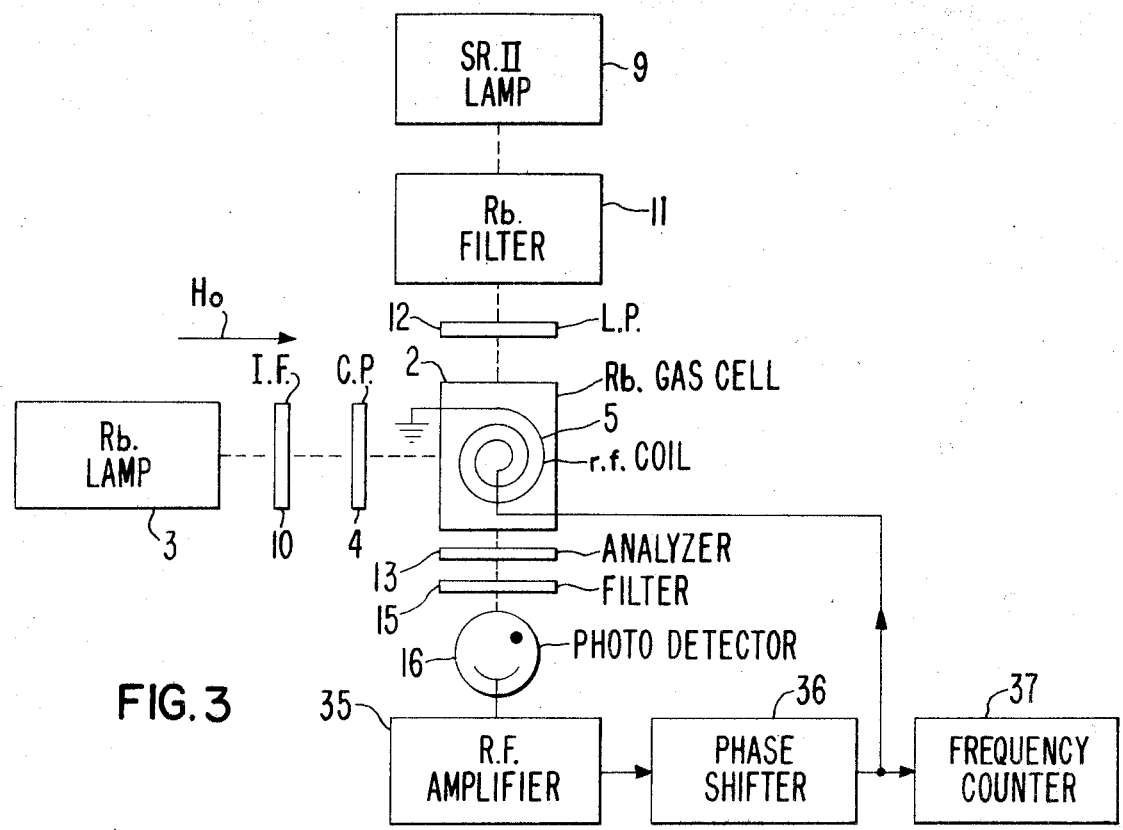
FIG. 3 is a schematic block diagram of a magnetometer employing features of the present invention.

Referring now to FIG. 1, there is shown a spectrometer 1 of the present invention. A conventional rubidium vapor gas cell 2 is disposed within its conventional surrounding oven, not shown. The rubidium vapor is optically pumped by means of a beam of rubidium resonance light obtained from lamp 3 which is beamed into the cell 2. The pumping light is filtered by an interference filter 10 to pass 7947° A. light and to remove an unwanted 7800 A. component. The filtered light is circularly polarized by circular polarizer 4 before the light passes into the rubidium gas cell 2.

A D.C. polarizing magnetic field $H_0$ on the order of 1 gauss is applied parallel to the direction of the pumping beam within the gas cell 2. A radio frequency magnetic field $H_1$ at a Zeeman resonance frequency of the rubidium vapor in the D.C. magnetic field $H_0$ is applied at right angles to the D.C. magnetic field $H_0$ via coil 5. A radio frequency signal generator 6 applies current to the coil 5 at the Zeeman resonance frequency. The applied RF magnetic field excites radio frequency resonance of the rubidium gas within the cell 2. The resonance is characterized by spin precession of the magnetization of the rubidium vapor about the direction of the D.C. magnetic field $H_0$ at the Zeeman resonance frequency.

A Helmholtz modulating coil 7 is coaxially aligned with the D.C. magnetic field $H_0$ and fed from a sweep generator 8. The sweep generator serves to sweep the D.C. magnetic field $H_0$ at a convenient low frequency such as 1 cycle every 15 seconds with a saw-tooth wave form. In addition, the sweep generator superimposes upon the saw-tooth signal a higher frequency sinewave modulation, at for example, 10 Hz. The saw-tooth sweep component for the sweep generator 8 is derived from a potentiometer of the recorder 21, more fully described below. The sine-wave modulation produces an intensity modulation of the Zeeman resonance at the 10 Hz. modulation frequency.

A strontium II flow lamp 9 serves as a source of strontium II optical resonance radiation with a resonance line at a wavelength at 4215.52 A. This line is very near to but not exactly at the $5^2S_{1/2} \leftrightarrow 6^2P_{1/2}$ transition corresponding to an optical resonance frequency of the rubidium vapor. A natural rubidium filter cell 11 filters the output of the strontium II lamp 9 to remove portions of the aforementioned 4215.52 A. line that might otherwise be absorbed by the rubidium vapor in the optically pumped cell 2. The filtered strontium II light is then beamed along a direction perpendicular to the pumping light beam and into the rubidium gas cell 2 through a linear polarizer 12.

At radio frequency resonance of the rubidium vapor, the precessing spin magnetization of the rubidium vapor serves to rotate the plane of linear polarization of the strontium II light which passes through the cell 2. The rotation of the polarization occurs at the Zeeman resonance frequency. During one-half cycle of the Zeeman resonance precession of the spin magnetization of the magnetization will be in the direction of the strontium light beam, thus rotating its plane of polarization of the light in one sense. During the next half cycle of the precession of the spin magnetization the spin magnetization will be opposed to the direction of the beam, thus rotating the plane of polarization of the light in the opposite sense.

A second linear polarizer 13 rotated 45° relative to the first linear polarizer 12 is disposed in the strontium II beam path after passage thereof through the rubidium gas cell 2. The second linear polarizer 13 serves as an analyzer and converts the rotational modulation of the plane of polarization of the beam into intensity modulation of the beam at the precession frequency of the spin magnetization (Zeeman resonance frequency).

The 45° relative orientation of the second linear polarizer 13 relative to the first linear polarizer 12 assumes that the gas cell 2 is optically thin i.e., produces less than about 0.1 radian of rotation of the plane of polarization of the probing beam in passage of the beam through the cell 2. With an optically thin sample 2, a 45° relative orientation of the linear polarizer 13 gives a fundamental modulation of the intensity of the transmitted probing beam at the Zeeman resonance frequency. If the second linear polarizer 13 is rotated 90° relative to the orientation of the first linear polarizer 12, with an optically thin cell 2, the resulting intensity modulation of the probing light beam will be at the second harmonic of the Zeeman resonance frequency. In some instances, it may be desirable to utilize the second harmonic rather than the fundamental of the Zeeman resonance signal. However, in the apparatus of FIG. 1 the fundamental component is utilized.

A light pipe 14 pipes the intensity modulated light through a filter 15 at 4215 A. to to filter out extraneous optical radiation not at 4215 A. The output of the optical filter 15 is piped to a photodetector amplifier 16, such as a photomultiplier tube, which detects the intensity modulation signal at the Zeeman resonance frequency and feeds the detected signal through a current amplifier, not shown, into one input of a balanced mixer 17.

A sample of the output of the RF generator 6 is fed to the other input terminal of the balanced mixer 17 via a variable phase shifter 18. The difference frequency output, i.e., D.C. output of the balanced mixer 17, which is moduluated at the 10 Hz. modulation frequency, is fed to one input terminal of a phase sensitive detector 19. A sample of the output of the sweep generator 8 at 10 Hz. is fed to the other input terminal of the phase sensitive detector 19. The D.C. output of the phase sensitive detector 19 is fed to a recorder 21 and recorded as a function of time or of the sweep frequency to obtain a recorded spectrum of the rubidium vapor within the cell 2.

Although rubidium alkali vapor has been used in the gas cell 2 at FIG. 1 other suitable alkali metal vapors may be utilized such as for example cesium, potassium, or sodium. Also it is noted that strontium II light has been utilized for the crossed probing beam, such light being filtered by a rubidium filter 11. A convenient way of obtaining the off-resonance probing light is to use one isotope of the alkali vapor in the crossed beam lamp 9, and to employ a second isotope for the gas cell 2. Then to employ a filter 11 which contains the same isotope as the gas within the cell 2 such that the resonant light is filtered out of the light of the probing beam thereby producing an off-resonance probing light beam.

In order for any off-resonant light to detect coherent resonance of the magnetic field dependent Zeeman resonance or the magnetic field independent hyperfine resonance of the optically pumped alkali vapor, the off-resonance optical radiation (light) should fulfill the following criterion:

$$|\lambda - \lambda(^2P_J)| << |\lambda - \lambda(^2P_{J'})|$$

where $\lambda$ is the wavelength of the light of the probing beam (beam of off-resonance optical resonance radiation), $\lambda(^2P_J)$ is the wavelength of the nearest one of the components of a resonance line doublet, and $\lambda(^2P_{J'})$ is the wavelength of the other component of the resonance line doublet. These three parameters are shown as lines 25, 26, and 27, respectively, of the energy level diagram of FIG. 2.

In summary, the probing light should be sufficiently close to and nearer to one of the lines of optical resonance of the vapor being probed than to an adjacent line of optical resonance. The probing light should not be so close to a resonance line of the vapor being probed that it is absorbed to any appreciable extent as this will produce unwanted depumping of the vapor being probed. In addition, such unwanted absorbed radiation reduces the transmission of the light through the sample and decreases the signal-to-noise ratio. However, the wavelength of the probing light should be sufficiently close to a resonance line of the vapor being probed that its polarization is appreciably modulated by the precessing spins of the vapor being probed.

Referring now to FIG. 3, there is shown a closed loop self-sustaining oscillator employed as a magnetometer. The apparatus is essentially identical to that of FIG. 1 except that the earth's field is used as $H_0$ and the D.C. field sweeper 8 and modulator are omitted. The Zeeman resonance precession signal, detected by the photodetector 16, is amplified by R.F. amplifier 35, phase shifted by phase shifter 36 and fed back to drive the RF coil 5 at the Zeeman resonance frequency to produce self-sustained R.F. oscillation at the Zeeman resonance frequency in the magnetic field $H_0$. Thus, changes in the intensity $H_0$ of the D.C. magnetic field produce corresponding changes in the Zeeman resonance frequency of the system. The frequency of oscillation is sampled and measured by a frequency counter 37 to give a measure of the magnetic field intensity $H_0$.

Figure 4:
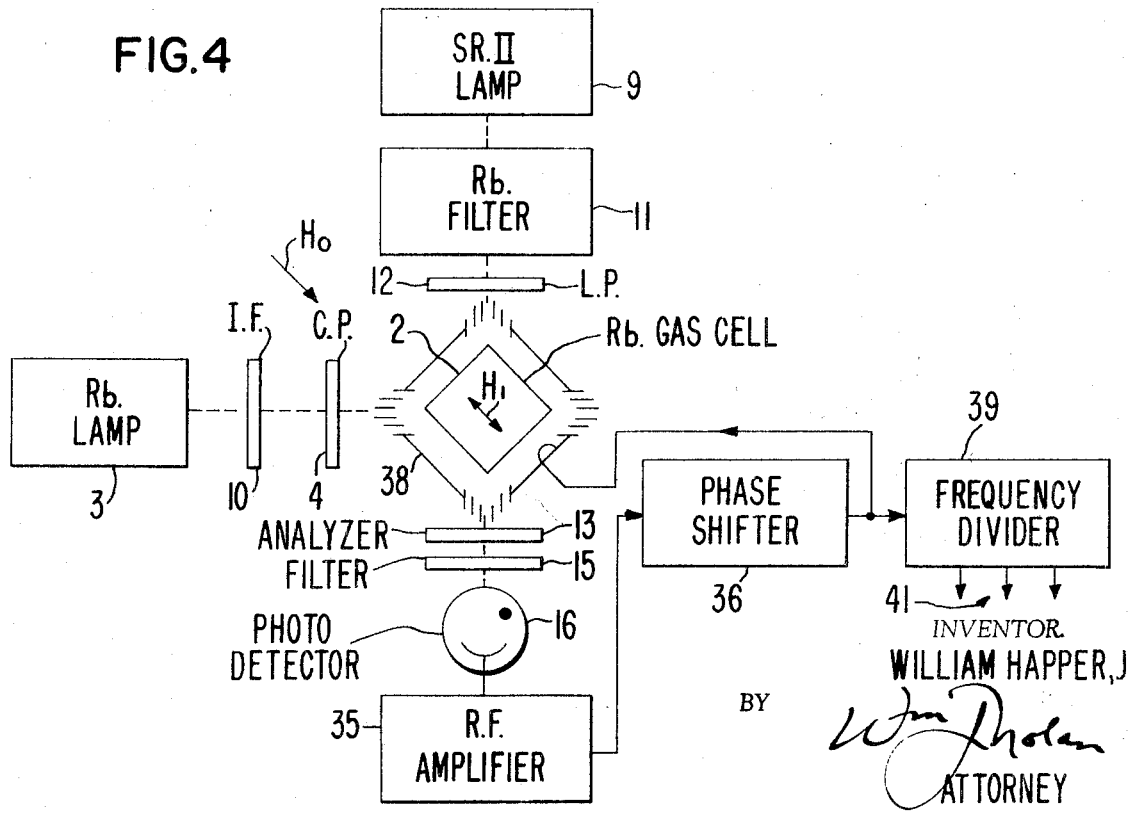
FIG. 4 is a schematic block diagram of a frequency standard employing features of the present invention.

Referring now to FIG. 4, there is shown a frequency standard incorporating features of the present invention. This apparatus is essentially identical to that of FIG. 3 except that a magnetic shield is employed to reduce the earth's field to less than a milligauss. A Helmoholtz coil, not shown, is energized to produce a weak D.C. magnetic field $H_0$, as of 10 milligauss, to separate the field dependent resonance lines from the desired field independent resonance line. The RF coil is replaced by a cavity resonator 38 tuned to a resonant frequency equal to that or a field independent hyperfine resonance such as the approximate 6 gHz. transition between the $F=3$, $m=0$, and $F=2$, $m=0$ levels of the $5^2S_{1/2}$ energy level of the rubidium vapor. The cavity 38 is oriented and excited in the high Q $TE_{0,1,1}$ mode to produce the 6 gHz. magnetic field $H_1$ parallel to the weak D.C. magnetic field $H_0$. The cavity 38 is apertured to permit passage of the light beams therethrough. The RF modulation of the probing beam at the hyperfine resonance frequency is picked up by the photodetector 16, which should be of the type having a high frequency resonance, amplified by RF amplifier 35 and fed back to sustain hyperfine resonance of the rubidium vapor. A sample of the hyperfine resonance signal is fed to a frequency divider 39 to produce more convenient low frequency, frequency standard outputs at 41.

The light beams are both at an acute angle to the direction of the polarizing magnetic field $H_0$. The light beam components that are parallel to the weak polarizing field $H_0$ are the ones that contribute to the pumping and detection functions. Thus, both light beams need not be perpendicular to each other but may be parallel to each other and to the polarizing field $H_0$. However, this latter arrangement produces problems concerning separation of the effects of the two beams. These problems concerning separation of the light beams can be avoided by having the beams cross at an acute angle.

Figure 5:
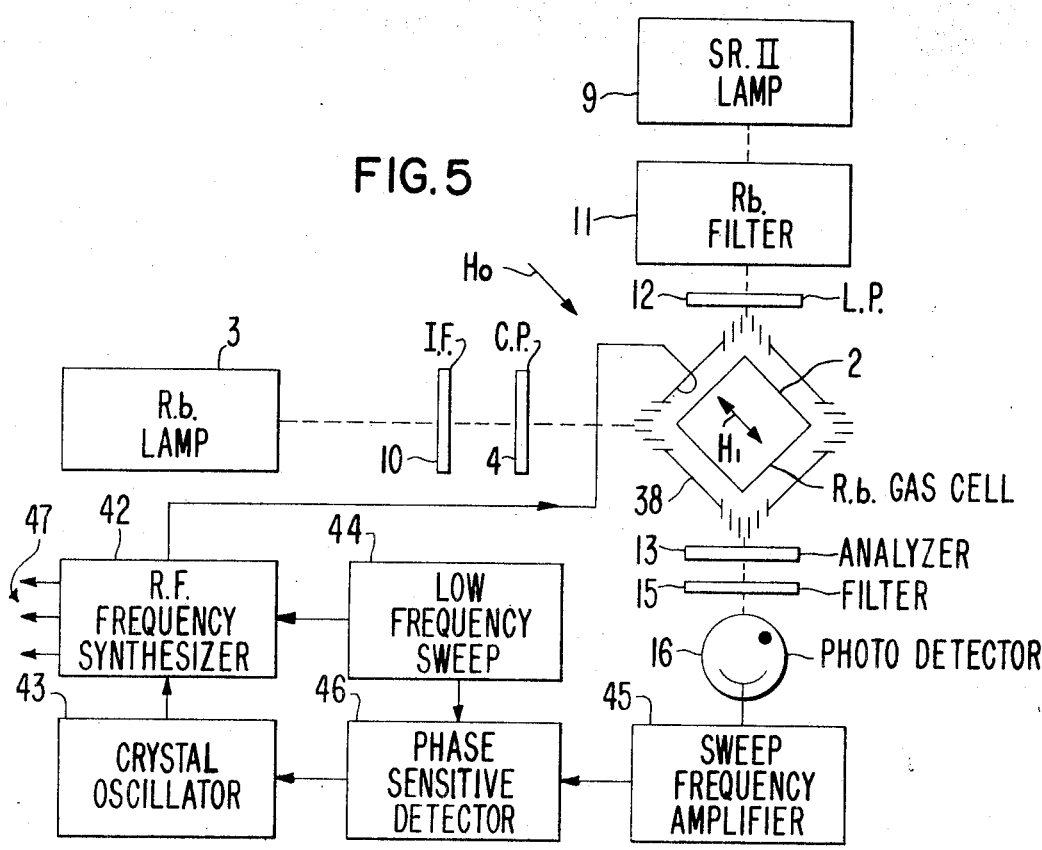
FIG. 5 is a schematic block diagram of an alternative frequency standard employing features of the present invention.

Referring now to FIG. 5, there is shown an alternative frequency standard employing features of the present invention. The apparatus is similar to that of FIG. 4 except that the radio frequency signal for driving the cavity resonator 38 at the hyperfine resonant frequency is derived from a frequency synthesizer 42. A crystal oscillator 43 feeds a reference signal into the frequency synthesizer 42 which takes the relatively low crystal frequency, as of 5 mHz., and synthesizes the 6 gHz. hyperfine resonance frequency. At hyperfine resonance of the rubidium vapor, the hyperfine signal is picked up in the photodetector 16. The hyperfine resonance is modulated by sweeping the frequency of the synthesizer to and fro about the hyperfine resonance frequency at some conveniently low frequency such as, for example, a few cycles per second. A low frequency sweep generator 44 serves to frequency modulate the output of the frequency synthesizer 42.

The low frequency modulation of the hyperfine resonance, as picked up in the photodetector 16, is amplified by a sweep frequency amplifier 45 and fed to one input terminal of a phase sensitive detector 46 wherein it is compared with a sample of the sweep frequency. The output of the phase sensitive detector 46 is a D.C. error signal which is fed to the crystal oscillator 43 to tune the oscillator to a frequency which when synthesized by the synthesizer 42 will be precisely at the center frequency of the hyperfine resonance line of the rubidium vapor. The frequency standard outputs are taken from the frequency synthesizer 42 at 47. The outputs are at convenient low frequencies such as 100 kHz., 1 mHz. and 5 mHz.

Figure 6:
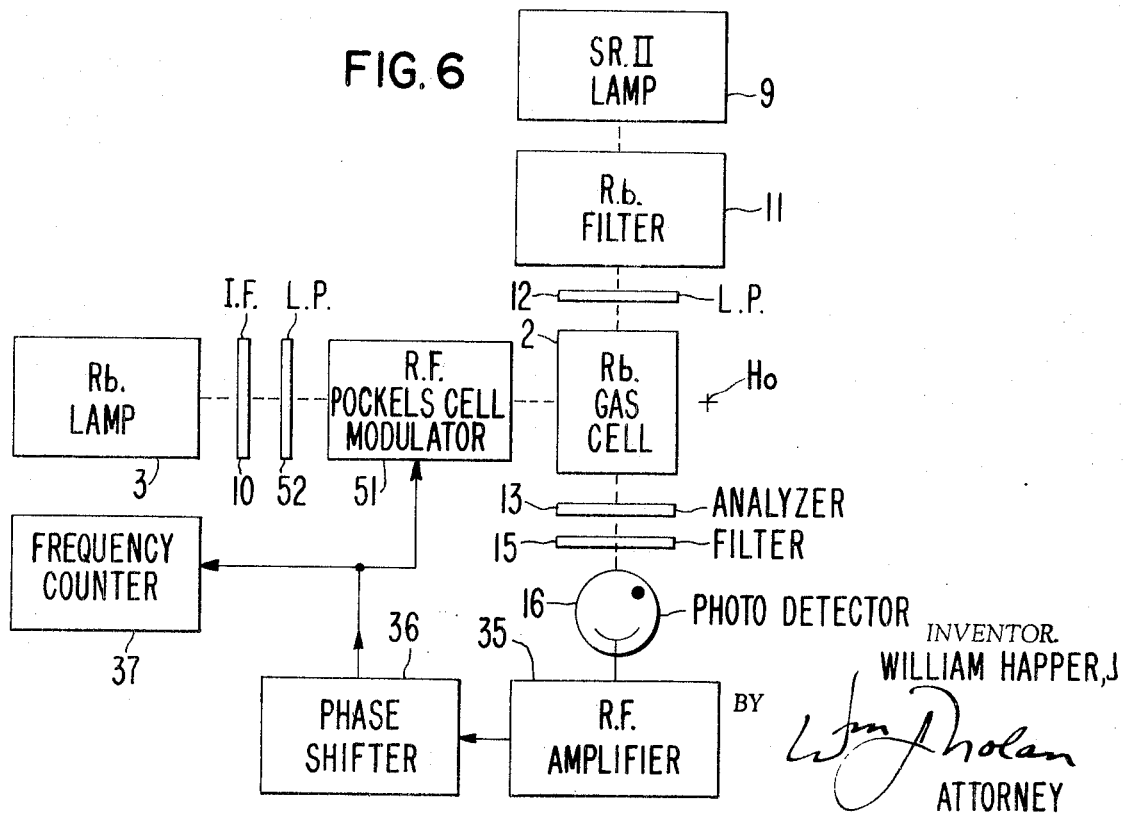
FIG. 6 is a schematic block diagram of an alternative magnetometer employing features of the present invention.

Referring now to FIG. 6, there is shown an alternative magnetometer of the present invention. In this embodiment, the apparatus is similar to that of FIG. 3 except that radio frequency resonance of the optically pumped rubidium vapor is produced by modulating the sense of the circular polarization of the applied pumping light at the Zeeman resonance frequency. A Pockels cell 51 receives linearly polarized optical pumping light from the lamp 3 which has been linearly polarized by linear polarizer 52. The output of the RF amplifier 35, at the Zeeman frequency, is phase shifted by phase shifter 36 and fed back to the Pockels cell for modulating the sense of the circular polarized output of the Pockels cell 51 between left and right handed circular polarization at the Zeeman frequency. This modulation serves to sustain Zeeman resonance of the rubidium vapor in the polarizing magnetic field $H_0$ which is perpendicular to both the beam of optical pumping radiation and to the beam of probing off-resonance light. The system operates in a closed loop self-sustaining mode of oscillation at the Zeeman resonance frequency.

A sample of the Zeeman resonance frequency is derived from the feedback circuit path and counted by the frequency counter 37 to give a measure of the magnetic field intensity $H_0$. Use of left and right handed modulated circular polarized optical pumping radiation (light) to produce Zeeman resonance is described in U.S. Pat. No. 3,173,082. Use of a Pockels cell for modulating a beam of optical pumping radiation to produce radio frequency Zeeman or hyperfine resonance of optically pumped alkali vapor is described and claimed in copending U.S. application Ser. No. 610,318 filed Jan. 19, 1967, and assigned to the assignee of the present invention.

In the various devices of the present invention, as described above, and which use off-resonance light as a probe to detect radio frequency resonance of the optically pumped sample vapor, there are a number of advantages over systems which use resonance radiation for detecting radio frequency resonance. There is no depumping of the optically pumped samples and, concomitantly, there is no attenuation of the probing light beam. Optically thick samples of vapor can be probed as easily as optically thin samples. The probing lamp's spectral profile and the absorption spectral profile of the pumped vapor are of minor importance when these profiles are well resolved. Broad, self-reversed lines from resonance lamps or narrow laser lines with single or multimode operation are equally suitable as probing light sources.

As pointed out above, the source of the off-resonance probing light can conveniently be obtained by use of an isotope of the alkali vapor within the cell 2 and by using a gas filter cell 11 employing the same isotope as that contained within the cell 2 to remove on-resonance light components.

The term "radio frequency" as used herein is defined to include frequencies from the audio range to the infrared range.

As used herein the term "light" is defined to mean optical radiation within the invisible range as well as within the visible spectrum.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an optically pumped alkali vapor resonance apparatus, means containing an ensemble of alkali vapor, means for applying a beam of resonance light to the ensemble of alkali vapor for optically pumping the alkali vapor, means for producing radio frequency resonance of the optically pumped alkali vapor, the improvement comprising, means for generating and passing a beam of off-resonance light through the alkali vapor to detect the radio-frequency resonance of the alkali vapor, such off-resonance light being sufficiently close in wavelength to an optically resonant wavelength of the alkali vapor such that the polarization of the off-resonance light is modulated by the radio frequency resonance and sufficiently different in wavelength from an optical resonance of the alkali vapor such that the off-resonance light is not appreciably absorbed by the alkali vapor, means for detecting the modulation of the polarization of the off-resonance light, and means for feeding a signal derived from the detected radio frequency resonance back to said means for producing the radio frequency resonance to produce self-sustaining oscillation of the apparatus at the radio frequency resonance frequency.

2. The apparatus of claim 1 wherein the feedback signal is at the frequency of the radio frequency resonance.

References Cited
UNITED STATES PATENTS 3,150,313　9/1964　Dehmelt ＿＿＿＿＿＿＿＿ 324—0.5

OTHER REFERENCES

Gozzini: Comptes Rendus, vol. 255, pp. 1905–1906, October 1962.

Manuel: Comptes Rendus, vol. 257, pp. 413–416, July 1963.

RUDOLPH V. ROLINEC, Primary Examiner

M. J. LYNCH, Assistant Examiner

U.S. Cl. X.R.

331—3, 94